United States Patent [19]

Card et al.

[11] Patent Number: 4,793,888

[45] Date of Patent: Dec. 27, 1988

[54] SYSTEM FOR UNDERWATER AND COLD TEMPERATURE BONDING

[75] Inventors: Steve W. Card, Minden; Joseph R. West, Bossier City, both of La.

[73] Assignee: Morton Thiokol, Inc., Chicago, Ill.

[21] Appl. No.: 884,443

[22] Filed: Jul. 11, 1986

[51] Int. Cl.$^4$ .................................................. C09J 5/02
[52] U.S. Cl. ................................. 156/307.3; 102/321; 156/305; 156/312; 156/313; 156/331.2; 248/205.3; 428/317.3; 428/317.7; 523/177
[58] Field of Search ............ 156/305, 313, 312, 307.3, 156/331.2; 248/205.3; 428/317.3, 317.7; 102/321; 523/177

[56] References Cited

U.S. PATENT DOCUMENTS

| | | | |
|---|---|---|---|
| 2,247,169 | 6/1941 | Gilbertson | 102/321 |
| 2,794,788 | 6/1957 | Coover et al. | 260/17 |
| 3,370,998 | 2/1968 | Wiswell | 156/71 |
| 3,564,078 | 2/1971 | Wicker, Jr. et al. | 260/881 |
| 3,749,628 | 7/1973 | Nancarrow et al. | 156/313 |
| 3,896,077 | 7/1975 | Leonard et al. | 156/331.2 |
| 4,273,598 | 6/1981 | Bowditch | 156/307.3 |

FOREIGN PATENT DOCUMENTS 2078763  1/1982  United Kingdom ............ 156/331.2

*Primary Examiner*—John J. Gallagher

[57] ABSTRACT

Objects may be bonded to target surfaces of a variety of materials, including rough surfaces, surfaces at temperatures down to −40° F. and surfaces submerged under water, by securing a sheet of compliant material to the object, applying cyanoacylate to the exposed surface of compliant material and pressing the object against the target surface for a time sufficient to establish a cure of the cyanoacrylate adequate to support the object from the target surface.

9 Claims, No Drawings

SYSTEM FOR UNDERWATER AND COLD TEMPERATURE BONDING

The present invention is directed to adhering one object to another under conditions where adhesives generally fail, including under water and at extremely cold temperatures.

BACKGROUND OF THE INVENTION

There exists a need for a system for adhering an object of some significant weight to the surface of another under harsh or unusual conditions that are generaly inimical to adhesive bonding, in particular, under water or at very cold temperatures. For example, military applications require a non-invasive means of attaching an object, such as a detonation device, to an underwater target surface, such as a submerged surface of a hostile ship. In cases where it is desired to adhere a detonation device to the surface of a ship under water, the surface material may be a variety of substances and may be rough or uneven. It is necessary that the device remain adhered for a sufficient period of time for personnel to remove themselves from the site, and in many cases, it may be desirable that the device remain adhered to the site for a period of several days.

In view of the need to be able to adhere weighty objects under water and also in very cold temperatures, generally regardless of the material or condition of the available surface, a large number of vendors of adhesive tapes, glues and the like were solicited. Among the requirements of a suitable adhesive were that it be able to be attached to a wet surface, including an underwater surface, and to support for at least three days at least $\frac{1}{8}$ pound for each square inch of contact area. No such material was found to be available, and many materials submitted by manufacturers proved to be dismal failures. Accordingly, it proved necessary to develop a novel system for adhering an object to a target surface so as to meet military requirements. In developing a novel system for adhering objects under harsh conditions, it is also recognized that there are civilian applications as well.

SUMMARY OF THE INVENTION

In accordance with the invention, a non-invasive method of adhering a weighty object to a variety of target surfaces, including rough or uneven surfaces, both under water and at very cold temperatures, i.e., down to −40° F. (−40° C.), includes providing a compliant sheet of backing material, attaching one surface of the same to the weighty object, within a short period of time prior to adhering the object to the target surface, applying a cyanoacrylate adhesive or glue to the exposed surface and pressing the cyanoacrylate-covered surface against the target surface while allowing the cyanoacrylate to cure sufficiently to hold the weighty object. It has been found that objects weighing up to $\frac{1}{8}$ pound per square inch of contact area and even upward can be established with a variety of target surfaces, including concrete, metallic and wooden surfaces, generally without regard to surface conditions. Sufficient curing to establish a bond is achieved within about 30 seconds, and bonds established entirely under water can be expected to last at least three days, even with some motion or vibration of the object having the target surface.

DETAILED DESCRIPTION OF CERTAIN PREFERRED EMBODIMENTS

In accordance with the present invention, it is found that cyanoacrylate adhesives may be applied to an exposed surface of a sheet of compliant backing material that is secured to a weighty object and that the cyanoacrylate-covered sheet may be pressed against a target surface, including cold, wet, or rough surfaces of a variety of materials, and adhesively bond thereto within a very short period of time so as to support the weighty object from the target surface. A wide variety of materials were tested, and it was found that achieving an underwater bond of sufficient load-bearing capabilities and sufficient durability was extremely difficult and that available materials and methods were entirely unsuitable. The fact that a cyanoacrylate adhesive in combination with a sheet of compliant backing material can be used to effect a bond entirely under water which meets desired requirements as an underwater adhesive is very suprising and unexpected and is contrary to what is generally accepted regarding the properties of cyanoacrylate adhesives.

A discussion of cyanoacrylate adhesives is provided in *Kirk-Othmer Encyclopedia of Chemical Technology*, H. F. Mark et. al. eds. John Wilson & Sons, New York, Vol. 1, pp 408–413. Among the teachings in this reference are that: highly exothermic polymerization which can result from the direct addition of alcohols, bases (including weak amines), water, or surface activating agents should also be avoided; that cyanoacrylate adhesives should be protected from moisture; and that moisture deteriorates cyanoacrylate polymer bonds. That underwater bonds which are unachievable using other adhesive materials can be achieved with cyanoacrylate is therefore entirely opposite to conventional understanding. Furthermore, the reference teaches that strongest bonds are obtained when the bond thickness is less than 50 microns. Bond strengths decrease and set times generally increase if the gap is greater than 50 microns thickness. Generally, cyanoacrylates are known to be most useful for forming bonds between smooth surfaces which promote formation of the very thin cured adhesive layers and strong bonds. Hence, it is further surprising and unexpected that reasonably strong bonds can be formed between the surface of a compliant backing sheet and a rough, porous surface.

Although applicants are not bound by any particular theory as to why bonds can be formed with cyanoacrylates under conditions which "fly in the face" of conventional understanding about the nature of cyanoacrylate adhesives, it is theorized that although moisture does effect a very rapid cure of cyanoacrylates, under rapid cure and heat-extracting conditions, cyanoacrylates are self-encapsulating. Thus, when a cyanoacrylate is expelled from its container under water, a surface cure is immediately effected, providing a thin protective casing or film around a volume of uncured cyanoacrylate. Such encapsulation may actually take the form of production of multiple microcapsules. Although water-initiated cure is known to be highly exothermic, the volume of water surrounding the cyanoacrylate represents a heat sink which is probably responsible for limiting the rate and extent of water-catalyzed cure. When the encapsulated-cyanoacrylate is pressed, e.g., through the weighty object and the compliant backing sheet against the target surface, water is locally pushed out from the target surface and the encapsulating film(s)

is ruptured, contacting yet uncured cyanoacrylate directly with both the exposed surface of the backing sheet and the target surface in the localized presence of sufficiently low concentration of water for an effective bond to be formed.

The compliant backing sheet ensures that a reasonable degree of close contact is established with a rough or uneven surface to provide a sufficiently strong bond. It is known that the most secure cyanoacrylate bonds are formed between smooth surfaces, and further it is found that a bond will generally not form directly between a relatively smooth surface of the weighty object and a relatively rough or porous target surface; nevertheless, effective bonds do form between cyanoacrylate-covered compliant backing sheets and rough and uneven target surfaces. Presumably, when pressed against the target surface, sufficient localized micro regions of the compliant backing sheet are in very close proximity to localized micro regions of the target surface, establishing localized strong bonding regions. It is appreciated that the invention does not generally provide bonds that anywhere near approach the holding power of cyanoacrylate bonds which normally form between smooth, dry surfaces, but that sufficient micro regions of strong bonding between the compliant backing and the target surface provide sufficient holding power per unit area to hold objects of at least $\frac{1}{8}$ lb. per in$^2$ of surface area (8.8 gm per cm$^2$).

Between micro regions of effective bonding, excess cyanoacrylate may not form strong bonds but may nevertheless cure to form polymeric mass which surrounds the micro regions of effective bonding. The bonds in the presence of water are not permanent, and it is believed that water eventually degrades the cyanoacrylate polymer; however, the bonding regions may be protected from water attack for a period of time until the surrounding polymeric mass is sufficiently degraded by water attack. Bonds formed in accordance with this invention are nevertheless demonstrated to have a sufficient life-expectancy for certain military applications and certain other applications, such as short-term emergency repairs.

To effect an underwater attachment, the backing material is preferably preattached to the weighty object, such as the detonation device. This may be by means of an adhesive which bonds between the surface of the weighty object and the compliant backing material sheet. Such adhesive need not be a cyanoacrylate adhesive, but can be any adhesive which bonds the surface of the object to the unexposed surface of the backing sheet under normal conditions and which equals or exceeds the requirement for maintaining the bond under conditions which the object is adhered to the target surface. Mechanical means may also be used to attach the backing sheet to the object. A thermoplastic backing sheet may be heat-welded to the surface of the object.

For underwater attachment, the cyanoacrylate is preferably evacuated from its container, e.g., by squeezing a tube, and applied to the compliant backing surface under water. In such case, the encapsulation as described above occurs immediately. Within a relatively short period of time, the object is then pressed against the target object. Generally, after application of the cyanoacrylate to the backing sheet, not more than about 15 minutes should elapse until application to the target surface. Typically, the time between cyanoacrylate application to the sheet and application of the object to the target surface will be much less, e.g., less than a minute. It is necessary to press the object against the target surface for a time sufficient to effect at least a partial cure in the micro bonding regions; however, this is generally about 30 second or less, a convenient amount of time for the object to the hand-held.

It is a convenience, rather than a requirement, that the cyanoacrylate be evacuated from its container under water, and the cyanoacrylate may be applied in air to the backing sheet and then submerged for attachment to the underwater target surface. If a detonation device is to be attached secretly to a target surface, it may be desirable to perform the whole process under water. On the other hand, for emergency underwater repairs, particularly when the repairer does not have underwater breathing equipment, it may be preferred to apply the cyanoacrylate to the backing sheet above the surface and then apply the object to the target surface under water.

An apparent advantage to evacuating the cyanoacrylate from its container under water is that the viscosity of the cyanoacrylate formulation is considered less important if evacuated from the container under water. Cyanoacrylate formulations having viscosities ranging from 75–10,000 cps (preferably 75 to 5000 cps) are used to provide successful bonds under water. As noted above, cure of an encapsulating film appears to be extremely rapid when applied under water, and it is likely that even the most fluid cyanoacrylates will self-encapsulate to a significant extent under water. On the other hand, if the cyanoacrylate is to be applied to the backing sheet in air, a more viscous cyanoacrylate formulation is preferred, i.e., in the range of from about 1000 to 10,000 cps. Curing is more uniform in air than in water, and although a protective film will form on globules of thickened cyanoacrylate formulations, highly fluid cyanoacrylate formulations may cure completely on the backing sheet before the backing sheet can be submerged and the weighty object applied to an underwater target surface. Even for underwater application, thickened cyanoacrylate formulations are preferred for ease of workability and to ensure encapsulation of sufficient quantities of uncured cyanoacrylates. That is, it is generally preferred to use cyanoacrylate compositions having viscosities above about 1000 cps.

The higher viscosity cyanoacrylate formulations comprise, in addition to cyanoacrylate monomers, viscosity regulators or thickeners, which are soluble in the cyanoacrylate monomer, such as polymethacrylates, cellulose esters and prepolymerized cyanoacrylic esters, as is known in the art, and these thickened cyanoacrylate formulations are considered within the scope of the invention, and in fact, represent preferred aspects of the invention.

The cyanoacrylate monomers are selected from among those known in the art, particularly alkyl 2-cyanoacrylates where the alkyl is a short, straight or branched-chain alkyl group having from one to five carbon atoms. The preferred cyanoacrylate monomer for purposes of this invention is ethyl 2-cyanoacrylate.

It is further preferred that the cyanoacrylate include polymerization inhibitors to increase shelf-life. Preferably, a combination of an anionic and a free-radical inhibitor is used for shelf-life extension. Known anionic inhibitors include phosphorus pentoxide, phosphoric acid, nitric oxide, sulfur dioxide and propane sulfone. Known free-radical inhibitors include hydroquinone, catechol and derivatives of hydroquinone and catechol.

It is further found that shelf-life is enhanced if the cyanoacrylate is packaged in metal containers, e.g., metal tubes. It is found that water molecules can slowly enter containers formed of polymeric material, initiating premature polymerization of the monomers.

The degree of compliancy required for the backing sheet depends upon the particular target surface, rougher target surfaces generally requiring sheets having a greater degree of compliancy. A smooth target surface may form a bond with an cyanoacrylate-covered backing sheet with little compliancy. However, generally, and particularly for military applications, the nature of the target surface must be considered to be unknown, thereby requiring a backing sheet of sufficient compliancy to establish a bond with substantially any rough surface. It can also be assumed that the application pressure will be that applied by a person, such as a scuba diver. It is therefore preferred that the material used as the backing sheet be sufficiently compliant such that when provided as a 1/16th in (0.0625 in.) sheet and a load added to give 0.20 psi, it compresses to about 0.04 in. or thinner and preferably at least about 0.025 in. or thinner.

It is preferred that the backing sheet be at least about 1/32 inch (0.8 mm) thick and more preferably at least about 1/16th inch thick. For certain applications even thicker backing material sheets may be used.

The porosity of the backing material does not appear to be particularly critical. Likewise whether the backing material is closed-cell or open-cell does not appear to be particularly critical. However, it may be that for particular purposes, backing material having certain physical characteristics such as porosity, open or closed cell etc., may be preferred.

To date the most success has been achieved using a tape sold under the trade designation, Mil-T-60394, which is obtained from Adhesive Research, Inc. The composition of the tape is proprietary; however, analysis has determined that the substrate, i.e., the backing material sheet, to be polyethylene foam, and analysis indicates that an adhesive on the surfaces of the tape is a mixture of a major proportion of hydrogenated rosin ester and a minor proportion of styrene-butadiene copolymer. This tape is two-sided and one side forms a bond with the surface which endures under water, providing a means of attaching the backing sheet to the object. On the other hand, the preapplied adhesive is totally ineffective in forming a bond with a wet or very cold surface. Tests with similar uncoated polyethylene foam preform in a similar effective manner; thus it is not believed the preapplied adhesive plays a significant function in forming the underwater bond, although some cyanoacrylate-adhesive interaction must occur.

Generally, so long as the backing material is a compliant polymer, the chemical composition of the backing material does not appear to be critical. Suitable backing sheet material includes, but is not limited to foams of polyethylene, polyester, cellophane, polyvinylchlorate and polypropylene.

The contour of the surface of the object to which the backing sheet is secured must conform sufficiently to the contour of the target surface. Generally, this means that the backing sheet is supplied to a flat surface of the object and the object is subsequently secured to a flat surface region of a target. If it is known in advance that the target surface will have other than a flat configuration, a surface of the object can be adapted to conform. It is also possible to employ a conformable means to permit adjustment of the contour of the attachment surface of the weighty object to the contour of the target surface. For example, a sheet of deformable metal might be attached to the weighty object and the backing sheet secured to the sheet of deformable metal. If it is found that the target surface, e.g., the hull of a ship, has too much curvature to establish a sufficient area of surface contact to adhere a flat object thereto, the deformable metal sheet and the backing material sheet secured thereto might be bent on-site into conformance with the contour of the target surface.

A further unexpected result in accordance with the invention is that the method works well in very cold conditions, including down to about $-40°$ F. The materials tested for underwater adhesion were also tested for low-temperature adhesion, and generally performance was poor or totally inadequate. It is found that a cyanoacrylate formulation on a compliant backing sheet will bond with a variety of surfaces at $-40°$ F. and such that bonds will last at least about 10 days. Not only is the cold detrimental to the adhering ability of many adhesives, but cold surfaces frequently are covered with condensate which is detrimental to many adhesive systems and, according to prior art teachings, would be expected to be highly detrimental to cyanoacrylate adhesives. Nevertheless, it is found that weighty objects can be adhered to cold target surfaces, including rough or uneven surfaces, by securing a compliant backing material sheet to the object, applying a cyanoacrylate formulation to the compliant material sheet and pressing the object against the target surface. Again, sufficient cure to hold the object is generally achieved in about 30 seconds; however, because extreme cold may inhibit polymerization rate, a slightly longer time of pressing the object against the surface may be desired.

As noted above, if the cyanoacrylate is to be evacuated from its container in air, it is greatly preferred to use a thickened formulation, e.g., between about 1000 and about 10,000 cps. The same principles hold true for low-temperature applications; however, if it is known beforehand that the object will be or is likely to be applied at very low temperatures, a cyanoacrylate formulation having a considerably lower room temperature viscosity may be used because at the application temperature, the actual viscosity of the formulation will be much higher. Accordingly, for low-temperature applications where the cyanoacrylate composition is evacuated from its container in atmosphere, the room temperature viscosity might be as low as about 300 cps. If the object is expected to be applied anywhere throughout a wide range of ambient temperatures, a cyanoacrylate formulation is preferred having an intermediate viscosity, e.g., in the range of about 1000 cps at room temperature.

The invention will now be described in greater detail by means of specific examples.

EXAMPLE 1

A preliminary screening procedure was established to test the durability of bonds formed by various adhesives and tapes when submerged under water. The target surface was either a vertical steel surface or a vertical, unfinished plywood surface. The object in each case was a steel T-bar, having a flat surface at the top of the T-bar of 1 in$^2$ and along with a suspended ⅛ lb weight weighing a total of approx. 1/5 lb. In the case of adhesives, the flat top surface of the T was covered with two-sided Mil-T-60394 tape, described above, and the exposed side of the tape was covered with an amount of the adhesive consistent with manufacturers' suggestions. All tapes were two-sided. After applying the adhesive (or tape) to the flat surface of the T-bar, the T-bar was pressed against the vertical surface for approximately 10 seconds. After sufficient time to effect a cure or hold according to manufacturers' suggestion, the assembly, including the metal or wood piece providing the target surface and the T-bar weight assembly, were submerged in water with the target surface maintained vertical. The results of the initial adhesive screening test are given below. The bonds were tested for only one hour and in the table below "Removal aft 1 hr" means that the bond held for at least one hour; an upper end time parameter was not determined.

Initial Adhesive Screening Test Results

| Chemical Class | Adhesive and Manufacturer | Adherence to Wood | Adherence to Steel |
|---|---|---|---|
| Epoxy Adhesives | Leech Products Quick-I-Poxy | 5 seconds | 35 seconds |
| | American Chemical Aquata Poxy | 0 seconds | 0 seconds |
| | American Chemical Quick Set | 7 seconds | 15 seconds |
| | Southwest Electronic Hardman's Wet Surface Patching Epoxy | 5 seconds | 30 seconds |
| | M & T's Epibond Epoxy | 5 seconds | 10 seconds |
| | Permalite's Sea Goin Poxy Putty | 2½ minutes | 2 minutes |
| Acrylic Adhesives | Permabond's Quickbond 612 | 8 minutes | 2 minutes |
| | Versilok 204 | 1½ minutes | 1 minute |
| | Versilok 506 | 10 seconds | 10 seconds |
| Urethane Adhesives | 3M 5230 Wood Adhesive | 30 seconds | 50 minutes |
| | 3M Urethane Sealer | 0 seconds | 0 seconds |
| | Schwartz Chemical Rez-N-Glue | 30 seconds | 0 seconds |
| Cyanoacrylate Adhesives | Permabond 102 | Removed aft 1 hr | Removed aft 1 hr |
| | Permabond 101 | Removed aft 1 hr | Removed aft 1 hr |
| | Permabond 910 | Removed aft 1 hr | Removed aft 1 hr |
| | Permabond 750 | Removed aft 1 hr | Removed aft 1 hr |
| | Permabond 200 | Removed aft 1 hr | Removed aft 1 hr |
| | Permabond 240 | Removed aft 1 hr | Removed aft 1 hr |
| | Loctite Corp's Super Bonder 416 | Removed aft 1 hr | Removed aft 1 hr |
| Polysulfide Adhesive | Morton Thiokol's T-13-P Part A & C116 Part B | 0 seconds | 0 seconds |
| | 3M's Scotch Seal | 42 minutes | Removed aft 1 hr |
| Latex Adhesives | Peter Cooper's PVE 179 | 0 seconds | 30 seconds |
| | DAP's Latex Construction and Sub Floor Adhesive | 20 seconds | 23 seconds |
| Rubber Based Adhesives | Tichenor's Chapco 35 | 0 seconds | 40 seconds |
| | DAP's Panel and Dry Wall Adhesive | 12 seconds | 1 minute |
| | DAP's Duratite 2000 | 20 seconds | 1 minute |
| | DAP's Duratite 4000 | 10 seconds | 30 seconds |
| Butyl Tapes | 3M's Tape 5354 | 0 seconds | Removed aft 1 hr |
| | W. J. Ruscoe Double Faced Tape | 0 minutes | Removed after 1 hr |

EXAMPLE 2

Upon obtaining the results described in Example 1, a similar experiment was performed using promising adhesives, except in this case, the entire bond formation procedure was conducted under water, including expelling the adhesive from its tube (or unwinding the tape from its roll), applying it to the submerged surface of the backing sheet and pressing the object against the exposed target surface. The following table gives the results ("Took off after 1 hr" means the bond lasted for one hour).

| Adhesive | Adherence to Wood | Adherence to Cold-Rolled Steel |
|---|---|---|
| Permabond 910 | Took off after 1 hr | Took off after 1 hr |
| Permabond 102 | Took off after 1 hr | Took off after 1 hr |
| Permabond 101 | Took off after 1 hr | Took off after 1 hr |
| Permabond 200 | Took off after 1 hr | Took off after 1 hr |
| Permabond 240 | Took off after 1 hr | Took off after 1 hr |
| Permabond 750 | 0 seconds | 0 seconds |
| 3M Tape 5354 | 0 seconds | 0 seconds |
| Ruscoe Tape | 0 seconds | 0 seconds |
| 3M's Scotch Seal | 0 seconds | 0 seconds |

EXAMPLE 3

Permabond cyanoacrylates (910, 102, 101, 700, 750, 200 and 240) were tested under the conditions of Example 2 for their adherence to plywood, cinder blocks and cold-rolled steel. With the exception of 750, all adhered to each surface for a minimum of one hour.

EXAMPLE 4

Under the conditions of Examples 2 and 3, Permabond 200 and 240 were found to bond for a 1 hour minimum to submerged surfaces of creosoted cross-ties and to cement.

EXAMPLE 5

Permabond 240, a preferred material due to its high viscosity (2400 csp) was further tested. Using the conditions of Examples 2–4, this material was found to establish three day adherence to the following surfaces: plywood, cinder blocks, and cold-rolled steel, aluminum and creosoted cross-ties, both in salt water and in fresh water.

Permabond 240 has been shown to form 3-day bonds under water even upon a 15 minute interval between application of the adhesive to the backing sheet and application of the object to the submerged surface.

EXAMPLE 6

Vertical surfaces, including those of aluminum, steel, wood, cinder block, and creosoted ties were chilled to −40° F. T-bar assemblies having a backing sheet as described above were coated with Permabond 240 at temperatures above about 7° F. (21° C.) and the assemblies were immediately applied to the chilled surfaces. The bonds were maintained at −40° F. for five days and then warmed to 70° F. and maintained for an additional five days. In each case, the assemblies were supported on the vertical surface by the adhesive bond.

Advantages of the invention may now be more fully appreciated. The invention provides for attachment of an object, such as a detonation device, to a variety of materials, including concrete, metallic and wooden materials which may be weathered or new, painted or unpainted, smooth or rough or wet or dry. If adhered dry, the object will be supported for at least 10 days, regardless of temperature of application; if adhered under water, either in salt water or in fresh water, the object will be adhered at least 3 days. Attachment may be to any portion of a target surface, including vertical and underside surfaces. The bond can withstand motion or vibration. Attachment is accomplished within 30 seconds. At least ⅛ lb of object is attachable per in² of surface area. The object can be quickly, easily, quietly and safely applied, even by an unskilled person. Objects can be applied under all weather conditions and during reduced visibility. Application temperature ranges extend from −40° F. to 125° F. (−40° C. to 52° C.). Less than ½ pound of adhesive is required for application of 20 pounds of object.

While the invention has been described in terms of certain preferred embodiments, modifications obvious to one with ordinary skill in the art may be made without departing from the scope of the present invention.

Various features are set forth in the following claims.

What is claimed is:

1. A method of adhering an object to a target surface which is submerged under water, the method comprising securing a sheet of compliant backing material to a surface of said object, leaving one surface of said backing material sheet exposed, applying to said exposed surface a cyanoacrylate formulation consisting essentially of a cyanoacrylate monomer with or without a dissolved thickening agent, said cyanoacrylate formulation having a viscosity between about 75 cps and about 10,000 cps, and pressing said object against said target surface to establish contact of said cyanoacrylate formulation-covered surface with said target surface and for a period of time sufficient to effect a cure of said cyanoacrylate formulation to form a bond between said backing sheet and said target surface of strength adequate to support said object from said target surface.

2. A method according to claim 1 wherein said cyanoacrylate formulation is evacuated from a container and applied to said exposed surface while submerged under water.

3. A method according to claim 1 wherein said cyanoacrylate formulation has a viscosity of between about 1000 cps and about 10,000 cps.

4. A method according to claim 1 wherein said backing material has efficient compliancy such that when provided as a 1/16th in sheet and a load added to give 0.20 psi it compresses to about 0.04 in. or thinner.

5. A method according to claim 4 wherein said backing sheet material is selected from the group consisting of polyethylene foam, polyester foam, cellophane foam, polyvinyl chloride foam, and polypropylene foam.

6. A method according to claim 4 wherein said backing sheet material is polyethylene foam.

7. A method according to claim 1 wherein said backing material has efficient compliancy such that when provided as a 1/16th in sheet sheet and a load added to give 0.20 psi it compresses to about 0.025 in. or thinner.

8. A method according to claim 1 wherein said object is pressed against said target surface for 30 seconds or less.

9. A method according to claim 1 wherein said object weighs at least about 8.8 gm per cm² of cyanoacrylate-covered surface area.

* * * * *